(12) United States Patent
Armstrong et al.

(10) Patent No.: US 9,359,830 B2
(45) Date of Patent: Jun. 7, 2016

(54) CABLEHEAD

(75) Inventors: Kenny Armstrong, Stavanger (NO); Morten Talgo, Sandnes (NO)

(73) Assignee: C6 Technologies AS, Stavanger (NO)

( * ) Notice: Subject to any disclaimer, the term of this patent is extended or adjusted under 35 U.S.C. 154(b) by 513 days.

(21) Appl. No.: 13/583,360

(22) PCT Filed: Mar. 9, 2011

(86) PCT No.: PCT/GB2011/000338
§ 371 (c)(1),
(2), (4) Date: Oct. 17, 2012

(87) PCT Pub. No.: WO2011/110813
PCT Pub. Date: Sep. 15, 2011

(65) Prior Publication Data
US 2013/0074309 A1     Mar. 28, 2013

(30) Foreign Application Priority Data
Mar. 9, 2010 (GB) .................................. 1003846.1

(51) Int. Cl.
*B23P 11/00* (2006.01)
*B23P 11/02* (2006.01)
(Continued)

(52) U.S. Cl.
CPC ............. *E21B 17/023* (2013.01); *F16B 7/0406* (2013.01); *Y10T 29/49826* (2015.01);
(Continued)

(58) Field of Classification Search
CPC ... E21B 17/023; E21B 17/028; E21B 17/026; E21B 17/02; F16B 7/0406; F16B 7/04

USPC ......... 174/84 R, 74 R, 88 R; 403/374.1, 288, 403/304; 29/446, 452, 559
See application file for complete search history.

(56) References Cited

U.S. PATENT DOCUMENTS 565,088 A * 8/1896 Nicholson ...................... 403/304
674,479 A * 5/1901 Shaw ............................. 403/304
(Continued)

FOREIGN PATENT DOCUMENTS

EP     0898046 A2     2/1999
GB     820 899     9/1959

OTHER PUBLICATIONS

Notification of Transmittal of the International Search Report and the Written Opinion of the International Searching Authority, or the Declaration corresponding to International Application No. PCT/GB2011/000338 mailed Aug. 20, 2012.
(Continued)

*Primary Examiner* — Essama Omgba
(74) *Attorney, Agent, or Firm* — Myers Bigel & Sibley, P.A.

(57) ABSTRACT

An apparatus for gripping a support member is described. The apparatus comprises a tubular clamp, the tubular clamp defining a throughbore adapted to receive a support member therethrough, a first apparatus member adapted to engage a first portion of an external surface of the tubular clamp, and a second apparatus member adapted to engage a second portion of the external surface of the tubular clamp. Relative movement of the first apparatus member with respect to the tubular damp in a first direction results in a deflection of a section of a first end of the tubular clamp into the clamp throughbore and relative movement of the second apparatus member in a second direction, opposite the first direction, with respect to the tubular clamp results in a deflection of a section of a second end of the tubular clamp into the clamp throughbore.

58 Claims, 15 Drawing Sheets

(51) Int. Cl.
  *H02G 3/06* (2006.01)
  *H02G 15/08* (2006.01)
  *E21B 17/02* (2006.01)
  *F16B 7/04* (2006.01)
(52) U.S. Cl.
  CPC .......... *Y10T29/49863* (2015.01); *Y10T 403/11* (2015.01); *Y10T 403/52* (2015.01); *Y10T 403/7064* (2015.01)

(56) References Cited

U.S. PATENT DOCUMENTS

| | | | | |
|---|---|---|---|---|
| 753,439 | A * | 3/1904 | Sinclair | 403/304 |
| 762,827 | A * | 6/1904 | Levalley | 403/304 |
| 796,854 | A * | 8/1905 | Nicholson | 403/304 |
| 802,269 | A * | 10/1905 | Creque | 403/304 |
| 1,037,682 | A * | 9/1912 | Streeper | 403/304 |
| 1,184,025 | A * | 5/1916 | Rothenbucher | 403/304 |
| 2,187,230 | A * | 1/1940 | Frank | 403/304 |
| 4,577,687 | A * | 3/1986 | Lanmon, II | 166/243 |
| 4,648,444 | A * | 3/1987 | Busch | 166/65.1 |
| 4,724,639 | A * | 2/1988 | Moser | 52/223.13 |
| 5,366,018 | A * | 11/1994 | Van Steenwyk et al. | 166/385 |
| 5,493,626 | A * | 2/1996 | Schultz et al. | 385/101 |
| 5,833,490 | A * | 11/1998 | Bouldin | 439/462 |
| 6,357,960 | B1 * | 3/2002 | Cornelius et al. | 403/381 |
| 6,752,397 | B2 * | 6/2004 | Kohli et al. | 277/322 |
| 6,761,002 | B1 * | 7/2004 | Sorkin | 52/223.13 |
| 2005/0274514 | A1 | 12/2005 | Tezuka et al. | |
| 2007/0140622 | A1 | 6/2007 | Kenison et al. | |
| 2011/0259601 | A1 * | 10/2011 | Withers | 166/377 |
| 2012/0018142 | A1 * | 1/2012 | Spence | 166/77.1 |
| 2015/0111420 | A1 * | 4/2015 | Zillinger et al. | 439/521 |

OTHER PUBLICATIONS

European Examination Report corresponding to European Application No. 11 710 812.6 mailed Nov. 3, 2015 (4 pages).

* cited by examiner

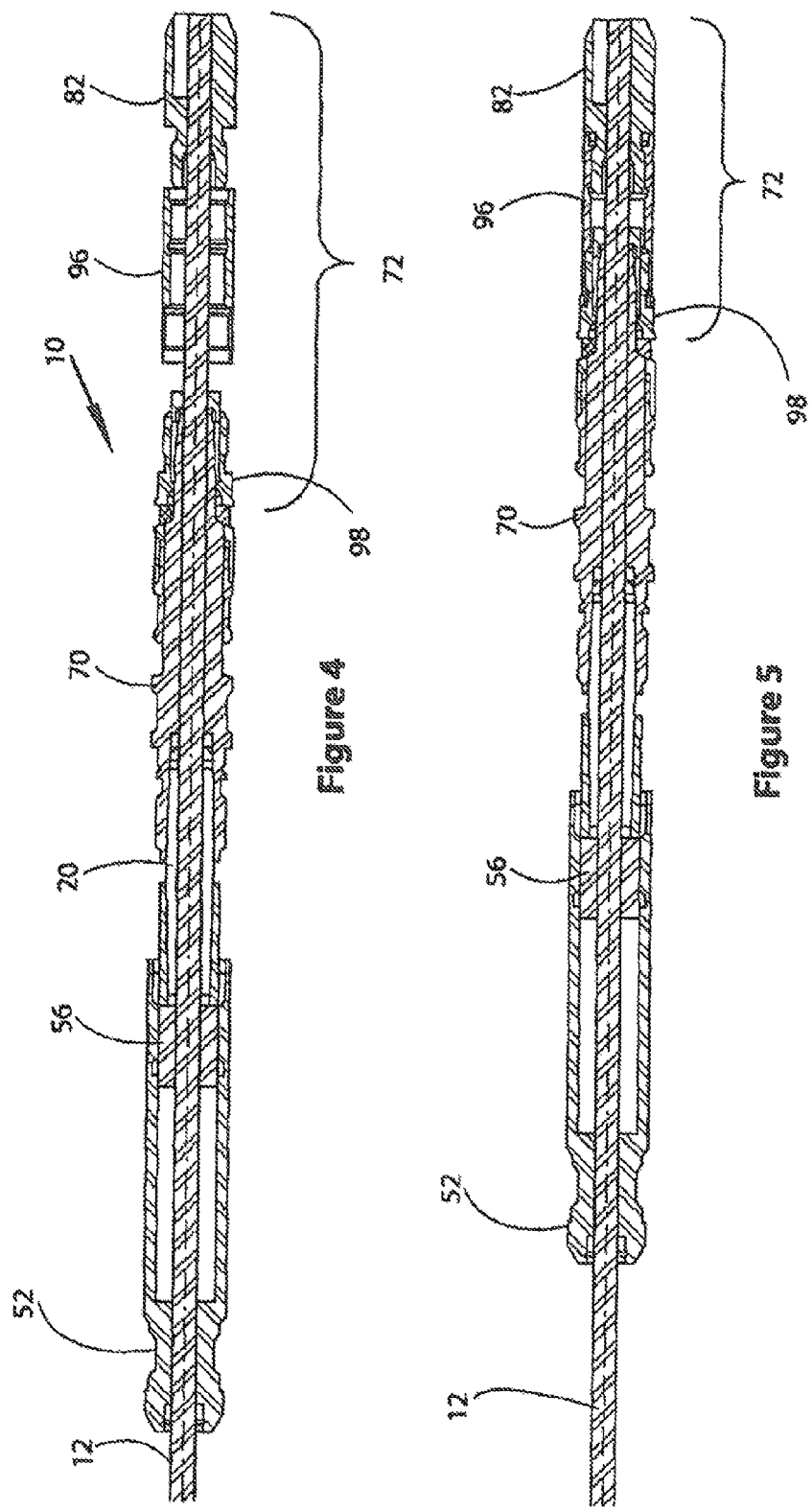

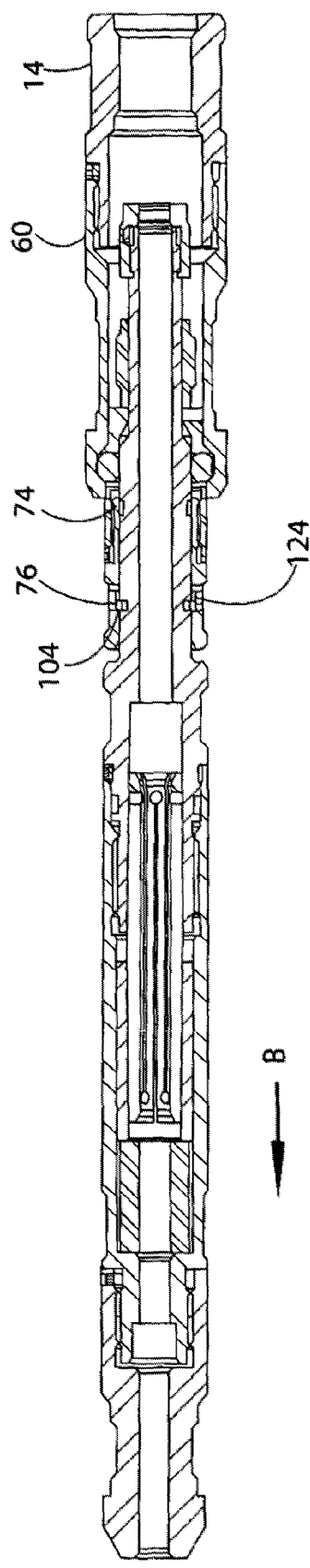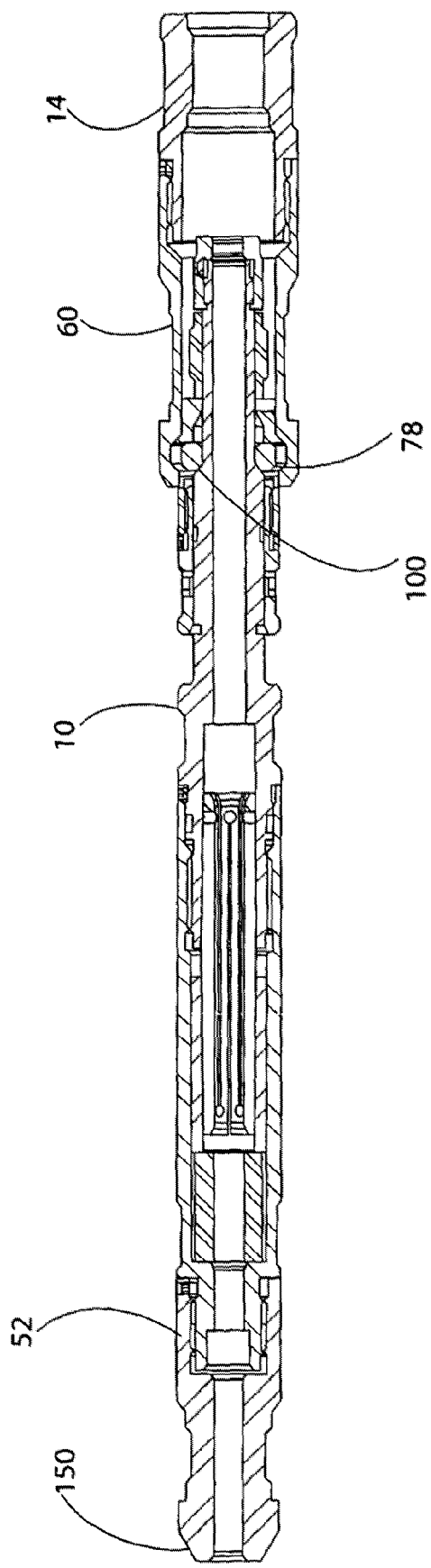
Figure 11
Figure 12

CABLEHEAD

RELATED APPLICATIONS

This application is a 35 §371 national stage application of PCT Application No. PCT/GB2011/000338, filed on Mar. 9, 2011, which claims priority from British Application No. 1003846.1 filed on Mar. 9, 2010, the contents of which are incorporated herein by reference in their entireties. The above-referenced PCT International Application was published as International Publication No. WO 2011/110813 A1 on Sep. 15, 2011.

FIELD ON THE INVENTION

The present invention relates to an apparatus for, and a method of, gripping a support member. Particularly, but not exclusively the apparatus is for gripping a support member in a downhole environment and providing an interface between a support member and a toolstring.

BACKGROUND TO THE INVENTION

Cableheads are used to connect support members such as cables, including wireline or slickline, composite cables, tubulars or rods to toolstrings. The cablehead provides the interface, both mechanical and in some cases electrical between the support member and the toolstring.

Conventional cableheads are known, however, these devices have drawbacks which, in some cases, decrease their utility. For example, it is known to provide a cablehead in which the grip increases as the load on the support member is increased. However these devices are only suitable for increasing the load in a single direction. If the load is increased in the opposite direction, the grip on the support member can be lost and, for example, the toolstring may be released from the support member to fall downhole.

Furthermore, a problem known in conventional devices is migration of gas through the cablehead which can lead to short circuit of electrical connections.

Conventional cableheads have to be assembled with great care to prevent damage to the support member. Over tightening a cablehead can crush the cable such that wires in the cable, for example, short circuit.

SUMMARY OF THE INVENTION

According to a first aspect of the present invention there is provided an apparatus for gripping a support member, the apparatus comprising:

a tubular clamp, the tubular clamp defining a throughbore adapted to receive a support member therethrough, a first apparatus member adapted to engage a first portion of an external surface of the tubular clamp, a second apparatus member adapted to engage a second portion of the external surface of the tubular clamp;

wherein relative movement of the first apparatus member with respect to the tubular clamp in a first direction results in a deflection of a section of a first end of the tubular clamp into the clamp throughbore and relative movement of the second apparatus member in a second direction, opposite the first direction, with respect to the tubular clamp results in a deflection of a section of a second end of the tubular clamp into the clamp throughbore.

In one embodiment of the present invention, an apparatus for gripping a support member is provided which is adapted to increase the grip on the support member if a pull is applied to the support member from either direction. In a downhole operation the pull can be provided from surface or from downhole. As a pull force is applied from the first direction, relative movement between the tubular clamp and the first apparatus member causes a section of the first end of the tubular clamp to deflect into the clamp throughbore and, in use, into a tighter engagement with the cable. Similarly, a pull force applied from the second direction causes relative movement between the tubular clamp and the second apparatus member with the result that a section of the second end of the tubular clamp deflects into the throughbore and, in use, into a tighter engagement with the support member.

The support member may be a cable.

The cable may be wireline or slickline.

The cable may be a composite cable.

The support member may be a tubular, such as a steel tubular or a composite tubular.

The support member may be a rod. The rod may be a composite rod.

The support member may be reelable.

The first apparatus member may be tubular.

The second apparatus member may be tubular.

The first apparatus member may define an internal surface adapted to engage the first portion of the clamp external surface.

The second apparatus member may define an internal surface adapted to engage the second portion of the clamp external surface.

The first apparatus member may be adapted to slide over the first portion of the clamp external surface.

The second apparatus member may be adapted to slide over the second portion of the clamp external surface.

The first and second apparatus members may be adapted to slide in a direction parallel to the tubular clamp throughbore.

The first and second apparatus members may be adapted to slide towards each other.

The clamp external surface first portion may define a taper.

The first portion taper may increase from the clamp first end towards the centre of the clamp. By increases it is meant that the distance of the external surface from the throughbore is greater towards the centre of the clamp than it is at the first end of the clamp.

The clamp external surface second portion may define a taper.

The second portion taper may increase from the clamp second end towards the centre of the clamp.

The first portion taper may be different angle to the clamp longitudinal axis to the second portion taper.

The first portion taper angle may be steeper than the second portion taper angle. Providing different taper angles allows the user to disengage one end of the tubular clamp from the support member before the other end.

The first apparatus member may define an internal surface with a taper which is complementary to the first portion taper.

The second apparatus member may define an internal surface with a taper which is complementary to the second portion taper.

The clamp may be slotted.

The clamp may define at least one first end slot, extending from the first end to adjacent the second end.

The clamp may define a plurality of first end slots. A plurality of first end slots divides the first end into a number of fingers, each finger separated by a first end slot.

The clamp may define at least one second end slot, extending from the second end to adjacent the first end.

The clamp may define a plurality of second end slots. A plurality of second end slots divides the second end into a number of fingers, each finger separated by a second end slot.

The clamp may define a first support member engaging surface adjacent the clamp first end.

The first support member engaging surface may be defined by the first end fingers.

The first support member engaging surface may define a profile. A profile may be provided to improve the grip of the clamp on the support member.

The profile may be a threaded profile. A threaded profile is relatively straightforward to create on the clamp internal surface. Alternatively any suitable friction increasing surface profile may be provided.

In an alternative embodiment, the first support member engaging surface may be smooth.

The clamp may define a second support member engaging surface adjacent the clamp second end.

The second support member engaging surface may be defined by the second end fingers.

The second support member engaging surface may define a profile. A profile may be provided to improve the grip of the clamp on the support member.

The profile may be a threaded profile. Alternatively any suitable friction increasing surface profile may be provided.

In an alternative embodiment, the second support member engaging surface may be smooth.

In a further alternative, the entire clamp internal surface may define a profile, the profile may be a threaded profile or any suitable friction increasing arrangement. Alternatively, the entire clamp internal surface may be smooth.

The first apparatus member may be adapted to releasably engage the second apparatus member.

The first apparatus member may releasably engage the second apparatus member by means of a threaded connection.

The first apparatus member may releasably engage an external surface of the second apparatus member.

The support member gripping apparatus may comprise an upper housing.

An internal surface of the upper housing may releasably engage the second apparatus member external surface.

The upper housing may be adapted to releasably engage the second apparatus member.

The upper housing may releasably engage the second apparatus member by means of a threaded connection.

The upper housing may releasably engage an external surface of the second apparatus member.

An internal surface of the upper housing may releasably engage the second apparatus member external surface.

The upper housing may define a throughbore adapted to receive the support member there through.

A portion of the upper housing throughbore may be adapted to receive the first apparatus member.

When the upper housing is releasably engaged with the second apparatus member, the first apparatus member may be wholly contained within the upper housing throughbore.

When the upper housing is releasably engaged with the second apparatus member, the first apparatus member may be relatively movable with respect to the upper housing.

During releasable engagement of the upper housing to the second apparatus member, the upper housing can move relative to the first apparatus member. In one embodiment, the first apparatus member may remain stationary. The upper housing may slide over the first apparatus member. This arrangement allows the first apparatus member and the second apparatus member to remain stationary, ensuring the clamp remains stationary, as the upper housing is connected to the second apparatus member. Movement of the clamp can result in damage to the support member.

The support member gripping apparatus may further comprise a resilient element.

The resilient element may be located within the upper housing throughbore.

The resilient element may be adapted to apply a force to the first apparatus member to move the first apparatus member with respect to the tubular clamp. As the upper housing and the second apparatus member are releasably connected, the resilient element may be trapped between the first apparatus member and the upper housing and apply force to the first apparatus member.

The resilient element may move the first apparatus member axially with respect to the clamp throughbore.

As the first apparatus member moves with respect to the tubular clamp, the friction between the first apparatus member and the tubular member will increase. Once the axial component of friction is greater than the force applied by the resilient element, further movement of the first apparatus member is prevented. In this way, over tightening of the clamp member onto the support member can be prevented.

The resilient member may be a spring.

The spring may be a compression spring.

The support member gripping apparatus may further comprise a mandrel.

The mandrel may be connected to the second apparatus member.

The mandrel may be integral with the second apparatus member.

The mandrel may define the second apparatus member.

The support member gripping apparatus may further comprise a collar, the collar being adapted to be releasably attachable to the toolstring and releasably attachable to the mandrel.

The collar may be releasably attachable to the mandrel by a subassembly.

The subassembly may be releasably attachable to the mandrel.

The subassembly may be releasably attachable to the mandrel by means of an at least one shear member.

The at least one shear member may be at least one disk or ring.

Alternatively, the at least one shear member may be a plurality of pins.

One of said at least one shear members may be adapted to shear before another of said at least one shear members. Such an arrangement permits redundancy to be built into the system. In an exemplary embodiment, and in the event of release prematurely by the first shear member or shear members, the load is borne by the second shear member or members until the shear force sufficient to shear them.

The apparatus may comprise a connection device.

In one embodiment, the connection device may be provided by the subassembly.

The connection device may be adapted to provide a connection between the support member and the toolstring.

The connection may be an electrical connection, a hydraulic connection, a fluid connection, a fibre optic connection or any suitable or desired connection.

The subassembly may be adapted to form a toolstring seal with the toolstring.

The toolstring seal may be elastomeric. Alternatively the toolstring seal may be non-elastomeric.

The subassembly may be adapted to form a support member seal with the support member.

The support member seal may be elastomeric. Alternatively the support member seal may be non-elastomeric.

The subassembly toolstring seal may be on a first side of the connection and the subassembly support member seal may be on a second side of the connection. Providing seals either side of the connection prevents water ingress or gas migration into the connection which, if the connection is an electrical connection, could create a short circuit.

In an alternative embodiment, the apparatus comprises at least one primary seal and at least one secondary seal.

The/each primary seal is provided between the support member and the external environment to prevent water ingress or gas migration into the connection.

The at least one primary seal may be a plurality of primary seals.

The/each primary seal may be an O-ring.

The at least one secondary seal may be adapted to cover at least part of the connection.

The at least one secondary seal may be a sleeve.

The sleeve may be a rubber sleeve. In some embodiments, the rubber sleeve may be a boot.

According to a second aspect of the present invention there is provided an apparatus for gripping a support member, the apparatus comprising:

a tubular clamp, the tubular clamp defining a throughbore adapted to receive a support member there through, a first apparatus member adapted to engage a first portion of an external surface of the tubular clamp, a second apparatus member adapted to engage a second portion of the external surface of the tubular clamp;

a housing adapted to releasably engage the second apparatus member, and a resilient member located within the housing and adapted, upon engagement of the housing and the second apparatus member, to apply a force to the first apparatus member to move the first apparatus member with respect to the tubular clamp.

In at least one embodiment of the present invention, an apparatus is provided which is arranged to apply force to a first apparatus member through a resilient member. Such an arrangement allows the force applied to the first apparatus member to be controlled and predetermined.

In one embodiment, at a predetermined degree of friction between the first apparatus member on the tubular clamp, further movement of the first apparatus member by the resilient member is prevented.

According to a third aspect of the present invention there is provided an interface between a support member and a toolstring, the interface comprising:

an electrical connector adapted to provide electrical connection between a support member and the toolstring, a tubular housing adapted to receive the support member and the electrical connector, the housing defining an engagement surface adapted to provide a first seal with a toolstring at a location below the electrical connector, and a seal element adapted to provide a second seal between the housing and the support member at a location above the electrical connector.

It will be understood that "above" and "below" are intended to identify positions on the interface, "above", in use in a downhole environment, being the location closer to surface and "below" being the location further from the surface.

According to a fourth aspect of the present invention there is provided a cablehead for use downhole, the cablehead comprising:

a first portion adapted to be releasably engaged with a cable;

a second portion adapted to be releasably engaged with a toolstring;

wherein the second portion is releasably connected to the first portion.

In an embodiment of the present invention, such an arrangement permits a portion of the cablehead to be recovered to surface in the event that the toolstring becomes jammed.

According to a fifth aspect of the present invention, there is provided a method of gripping a support member, the method comprising the steps of:

feeding a support member through a tubular clamp throughbore, engaging a first apparatus member with a first portion of an external surface of the tubular clamp;

engaging a second apparatus member with a second portion of the external surface of the tubular clamp;

moving the first apparatus member relative to the tubular clamp in a first direction such that a section of the first end of the tubular clamp deflects into engagement with the support member; and moving the second apparatus member relative to the tubular clamp in a second direction, opposite the first direction, such that a section of the second end of the tubular clamp deflects into engagement with the support member.

According to a sixth aspect of the present invention there is provided an apparatus for gripping a support member, the apparatus comprising:

a tubular clamp, the tubular clamp defining a throughbore adapted to receive a support member therethrough, a first apparatus member adapted to engage a first portion of an external surface of the tubular clamp, a second apparatus member adapted to engage a second portion of the external surface of the tubular clamp;

wherein tubular clamp external surface defines a decreasing circumferential taper, the taper relative movement of the first apparatus member with respect to the tubular clamp in a first direction results in a deflection of a section of a first end of the tubular clamp into the clamp throughbore and relative movement of the second apparatus member in a second direction, opposite the first direction, with respect to the tubular clamp results in a deflection of a section of a second end of the tubular clamp into the clamp throughbore, the first and second portions surfaces being tapered, each taper decreasing towards the end of the tubular clamp to which it is closest.

It will be understood that preferred features of one aspect may be equally applicable to other aspects but have not been repeated for brevity.

BRIEF DESCRIPTION OF THE DRAWINGS

Embodiments of the present invention will now be described with reference to the accompanying drawings in which:

FIG. 4 is a longitudinal section of the apparatus of FIG. 1 in a disassembled configuration;

FIG. 5 is a longitudinal section of the apparatus of FIG. 1 in a partially assembled configuration;

FIG. 11 is a longitudinal section of the apparatus of FIG. 1 in a partially released configuration;

FIG. 12 is a longitudinal section view of the apparatus of FIG. 1 in a fully released configuration;

DETAILED DESCRIPTION OF THE DRAWINGS

Figure 1:
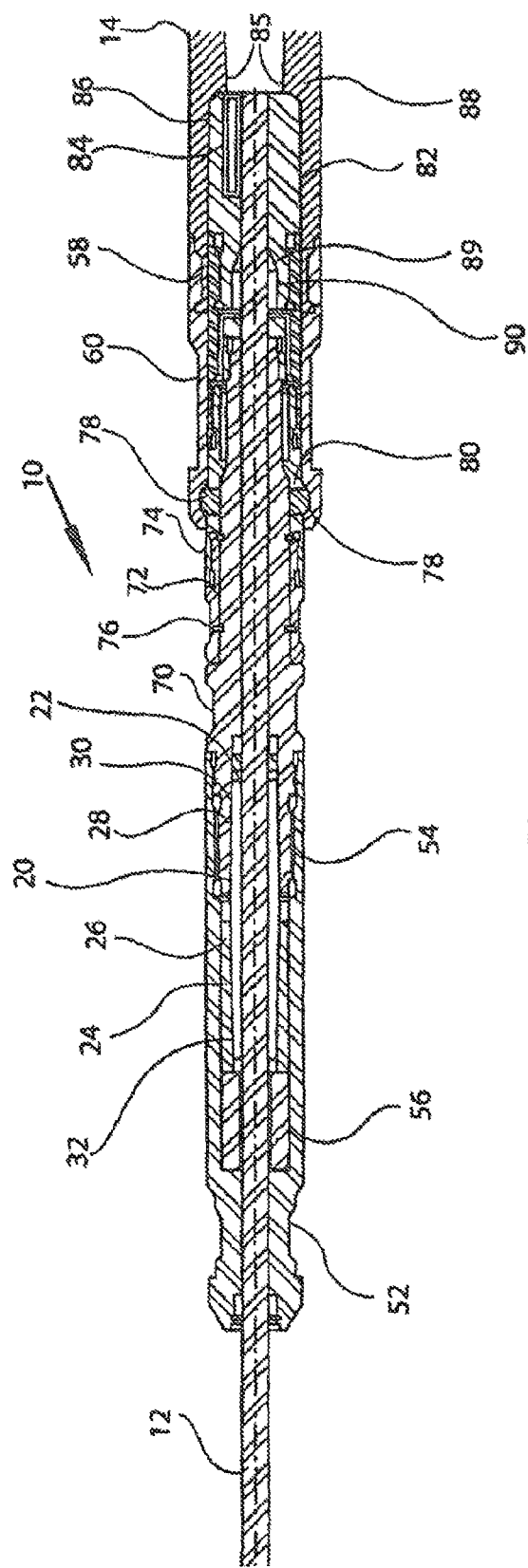
FIG. 1 is a longitudinal section of an apparatus for gripping a support member, in the form of a cable, in an operational configuration, according to a first embodiment of the present invention.
Figure 2:
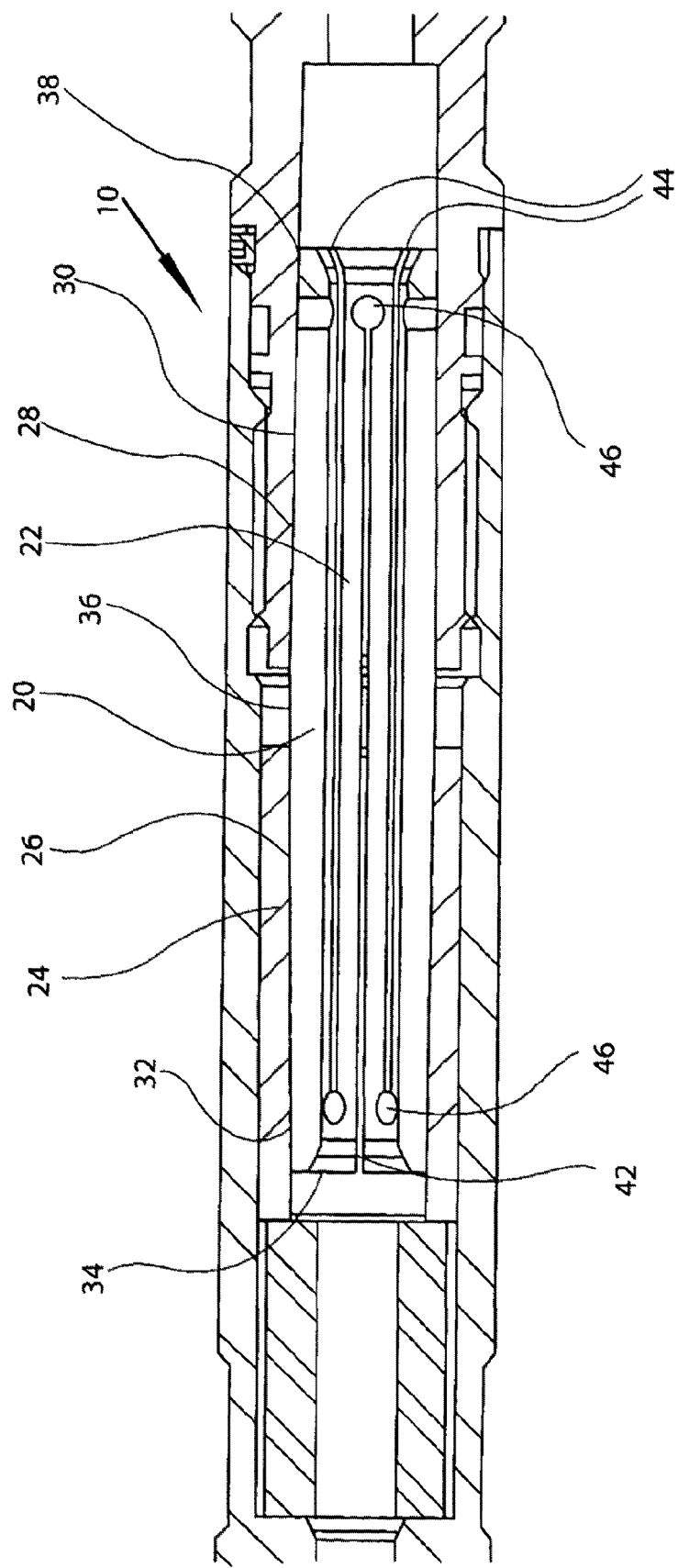
FIG. 2 is an enlarged longitudinal section of an apparatus of FIG. 1 shown without the cable.

Reference is made to FIG. 1, a longitudinal section of an apparatus, generally indicated by reference numeral 10 for gripping a support member 12, in the form of a cable 12, and FIG. 2, an enlarged longitudinal section of part of the apparatus of FIG. 1 shown without the cable 12 according to an embodiment of the present invention. Particularly the apparatus 10 is a cablehead 10 for connecting a wireline cable 12, adapted to carry electrical signals, to a toolstring 14 for use in downhole operations in a hydrocarbon well (not shown).

The cablehead 10 comprises a tubular clamp 20 defining a throughbore 22 (best seen in FIG. 2). The apparatus 10 further comprises a first apparatus member 24 adapted to engage a first portion 26 of an external clamp surface 32 and a second apparatus member 28 adapted to engage a second portion 30 of the external clamp surface 32.

Referring to FIG. 2, it will be noted that the tubular clamp external surface first portion 26 tapers radially outwards from a first clamp end 34 to the centre 36 of the clamp 20 and the clamp external surface second portion 30 tapers radially outwards from a clamp second end 38 to the clamp centre 36.

Figure 3:
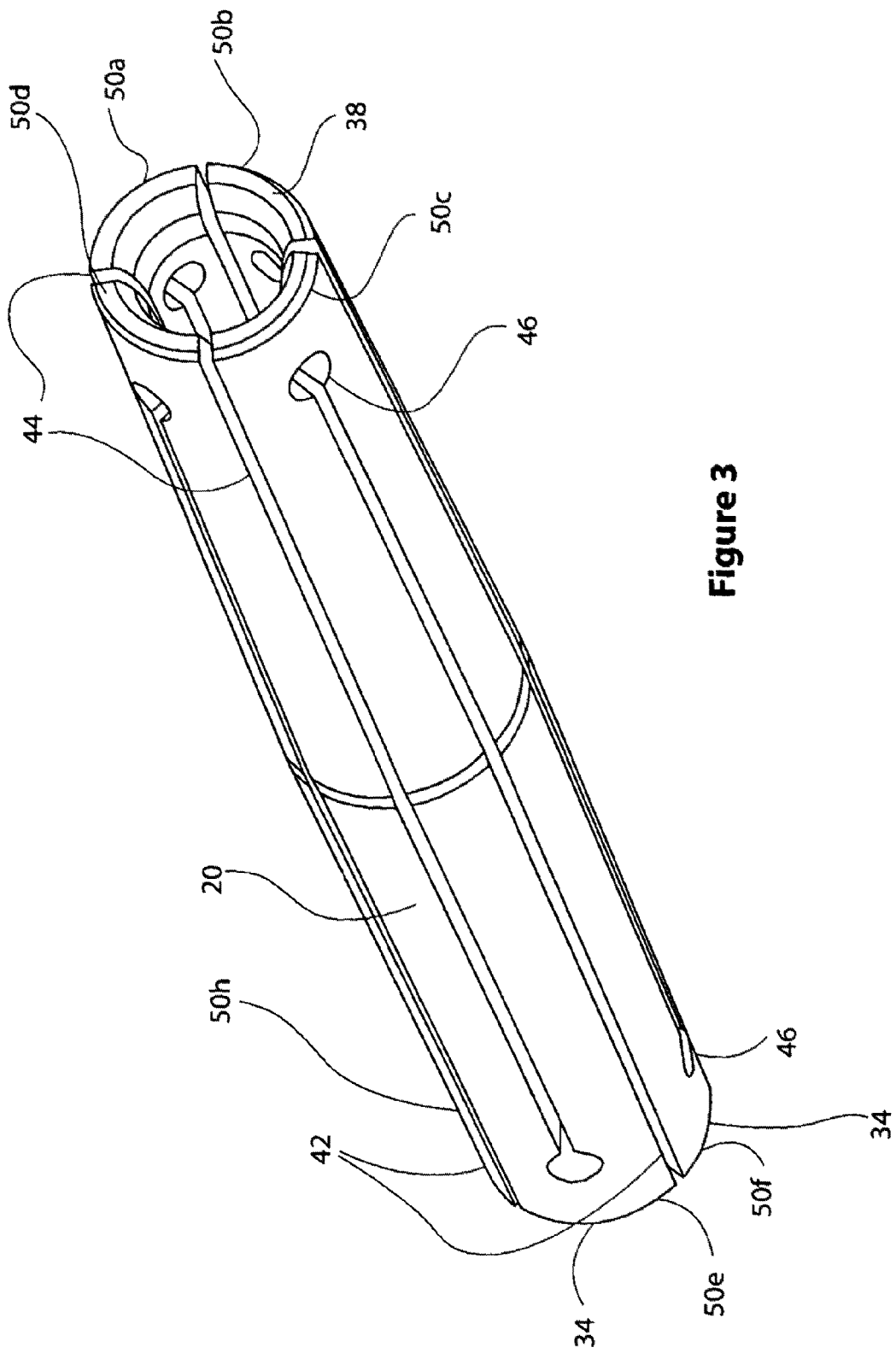
FIG. 3 is a perspective view a clamp of the apparatus of FIG. 1.

Referring to FIG. 2 and FIG. 3, a perspective view of the tubular clamp 20 of the apparatus of FIG. 1, it will be noted that the clamp 20 comprises a plurality of clamp first end slots 42 and a plurality of clamp second end slots 44. The clamp first end slots 42 extend from the clamp first end 34 along the length of the clamp 20 and terminate in a stress relief hole 46 adjacent the clamp second end 38. Similarly each second end slot 44 extends from the clamp second end 38 to a stress relief hole 46 adjacent the clamp first end 34. Referring to the clamp second end 38, shown most clearly in FIG. 3, the clamp second end slots 44 divide the clamp second end 38 into four fingers 50a-d. Referring back to FIG. 2, during relative movement between the clamp 20 and the second apparatus member 28 in which the second apparatus member 28 moves along the clamp second surface portion 30 towards the clamp centre 36, the second end clamp fingers 50a-d will deflect radially inwards into engagement with the cable 12 (shown in FIG. 1) thereby clamping the cable 12.

A similar process of clamping the cable 12 occurs at the clamp first end 34 such that when the apparatus 10 is in use, the cable 12 is clamped in two positions. As will be explained, if a pull is applied to the cable 12 from surface or by the toolstring 14, the grip the clamp 20 applies to the cable 12 is increased at either the first or second ends depending on the direction of the pull, resulting in tighter engagement with the cable 12 and improved performance.

Referring back to FIG. 1, the apparatus 10 further comprises an upper housing 52 releasably connected to the second apparatus member 28 by a threaded arrangement 54. The first apparatus member 24 is sandwiched between the upper housing 52 and the clamp 20 but is free to move with respect to both the upper housing 52 and the clamp 20 as space permits.

Also contained within the upper housing 52 is a compression spring 56 for applying a force to the first apparatus member 24, the interaction between the clamp 20 and the first apparatus member 24 will be described in due course.

The second apparatus member 28 is part of a cablehead mandrel 70. Referring to FIG. 1, the apparatus 10 further comprises a cablehead subassembly 72 releasably attached to the mandrel 70. The cablehead subassembly 72 comprises a shear sub 98, a connector sleeve 96 and a connector 82.

The cablehead subassembly 72 is releasably attached to the mandrel 70 by means of first and second shear discs 74, 76, the discs 74,76 adapted to shear when subject to an axial load greater than a given value. As will be described, the shearing of the discs 74,76 frees the cablehead subassembly 72 from the toolstring 14 in the event of the toolstring 14 jamming.

The subassembly 72 is connected to the toolstring 14 by a toolstring attachment collar 60. The collar 60 is releasably attached to the cablehead subassembly 72 by means of six keys 78 mounted in apertures 80 defined by the subassembly 72. The collar 60 is connected to the toolstring 14 by means of a threaded connection 58. The purpose of the shear discs 74, 76 and the key 78, as will be described in due course, is to permit the mandrel 70 to release from the collar 60 in the event that the toolstring 14 gets jammed downhole to allow the cablehead 10, without the collar 60, to be recovered to surface. Specialist tools can then be sent downhole to recover the toolstring 14. As the cablehead 10 (minus the collar 60) is returned to surface, it can be reused without the need to having to remake the entire connection.

The subassembly connector 82 facilitates electrical connection between the cable 12 and the toolstring 14. The wireline cable 12 comprises a number of electrical conductors (not shown) which are linked to the toolstring 14 via a Gearhart Owen transfer device 84 housed within the connector 82. The integrity of the electrical connection between the cable 12 and the toolstring 14 is paramount and a fluid tight environment is essential for successful operation. A fluid tight environment is provided by an elastomeric seal 85 made between an angled surface 86 defined by the connector 82 and a complementary angled surface 88 defined by the toolstring 14. When the collar 60 and the toolstring 14 are secured in position by the keys 78, the surfaces 86, 88 are pulled into a tight engagement providing a fluid tight seal.

A further fluid tight seal is provided by an elastomeric seal 90 provided between the cable 12 and the connector 82. This will be discussed in due course.

The operation of the cablehead will now be described with reference to FIGS. 4 to 13.

FIG. 4 is a section view through the cablehead 10 of FIG. 1 prior to assembly. The cable 12 is threaded through the upper housing 52, the spring 56, the clamp 20, the mandrel 70 and the subassembly components 72 including the connector 82.

The first stage of the assembly process is shown in FIG. 5. First the connector 82 is fed into the connector sleeve 96 which is in turn secured to the shear sub 98 by a threaded connection.

The collar 60 (not shown) is then slid over the outside of the subassembly 72. The collar 60 is then threadedly connected to the toolstring 14 (not shown) until the elastomeric seal 85 between the toolstring 14 and the subassembly connector 82 is made.

Figure 6:
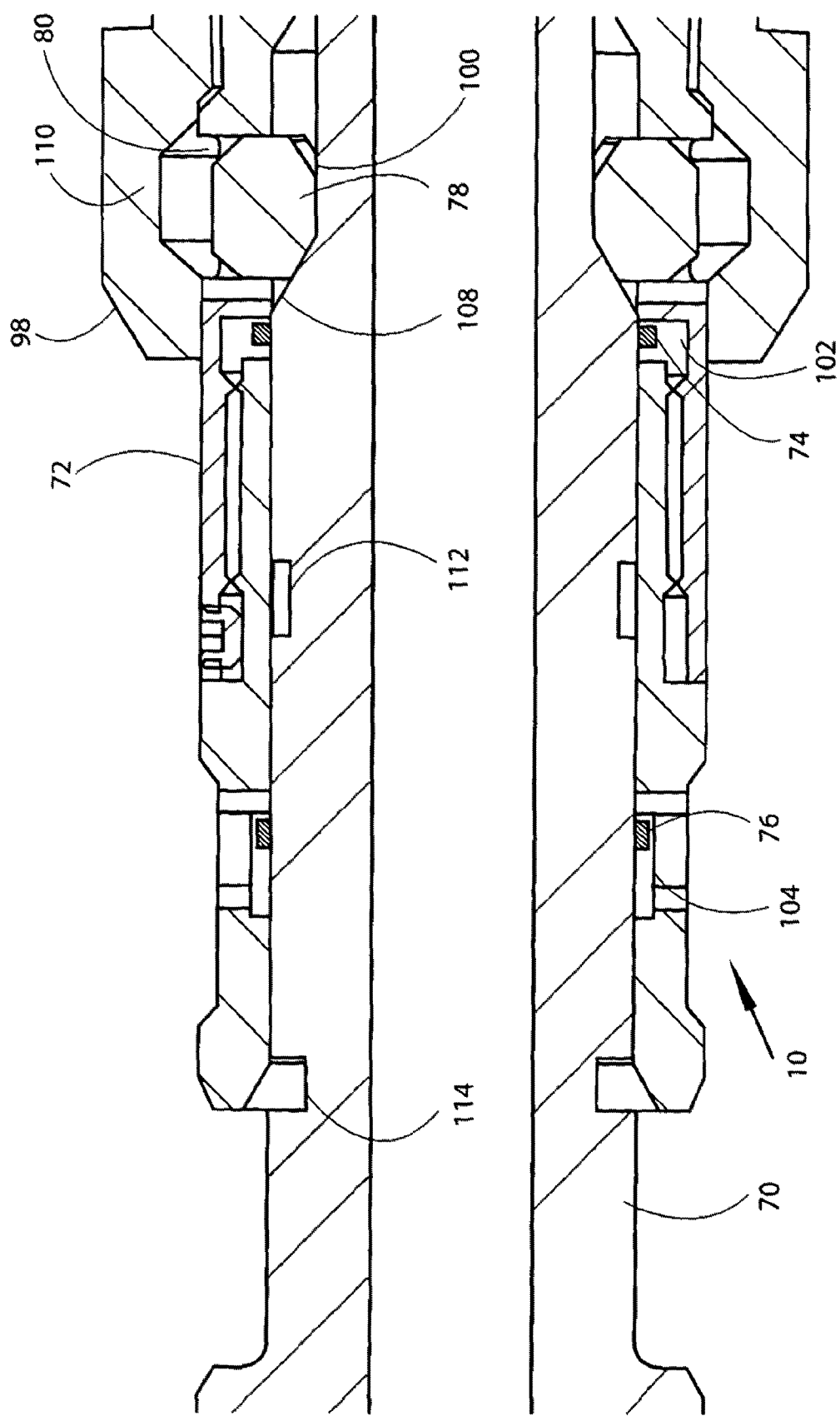
FIG. 6 is an enlarged longitudinal section of part of the apparatus of FIG. 1 in another partially assembled configuration.

Referring to FIG. 6, a close up section of part of the apparatus 10 of FIG. 1 in a semi assembled state. The collar 60 has been slid over the outside of the subassembly 72. As the keys 78 sit in a recess 100 defined by the mandrel 70 the end 98 of the collar 60 is able to pass over the keys 78.

Figure 7:
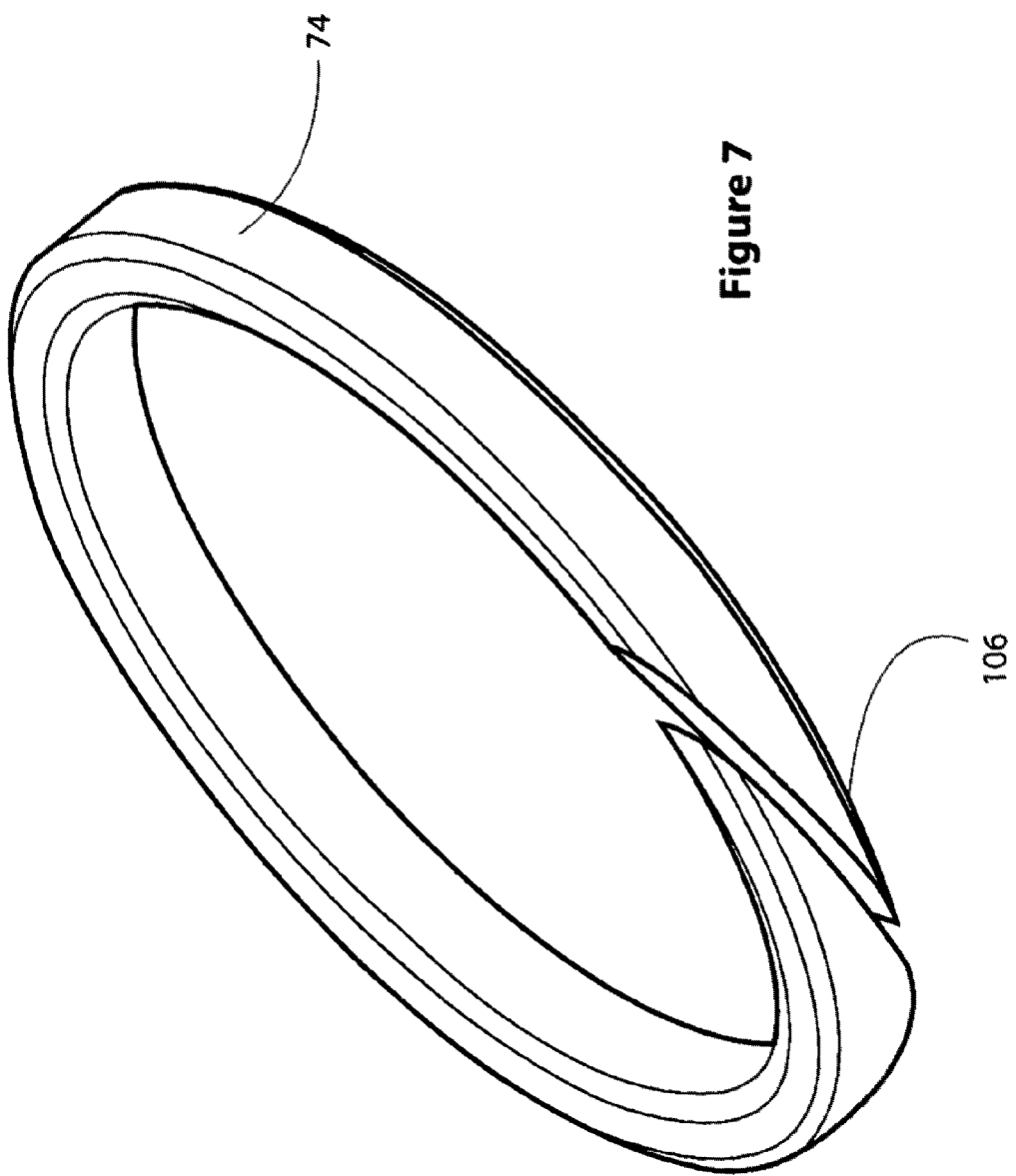
FIG. 7 is a perspective view of a first shear disc of the apparatus of FIG. 1.

Also visible in this drawing are the first and second shear discs 74, 76. These discs 74, 76 are shown located in first and second shear sub recesses 102, 104 respectively. Referring to FIG. 7, a perspective view of the first shear disc 74, the shear disc 74 is a brass split ring. The provision of a slit 106 allows the split ring 74 to be stretched over the mandrel 70.

Referring to FIG. 6, as the subassembly 72 is moved up the mandrel 70 the keys 78 engage a mandrel slope 108 which forced the keys 78 to move radially outwards into a collar recess 110. As the subassembly 72 moves with respect to the mandrel, the first and second split rings 74, 76 move towards first and second shear disc recesses 112, 114 defined by the mandrel 70. Once the shear discs 74, 76 reach the recesses 112, 114, they contract and recover their original dimensions and sit partially in the subassembly recesses 102, 104 and partially in the mandrel recesses 112, 114. This position is best shown in FIG. 8.

Figure 8:
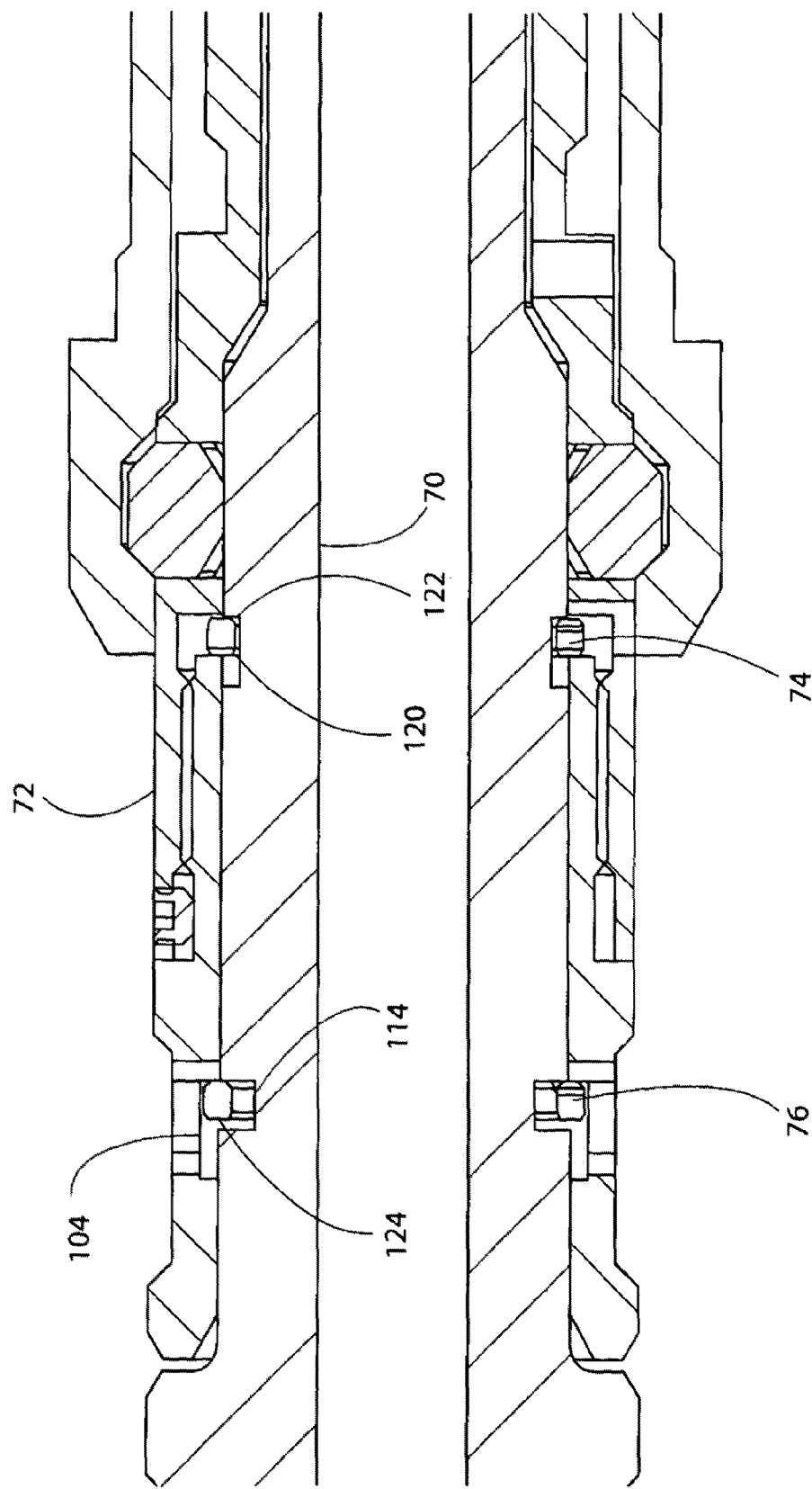
FIG. 8 is an enlarged longitudinal section of part of the apparatus of FIG. 7 in the assembled configuration.

It will be noted from FIG. 8 that the first shear disc 74 has a first edge 120 in contact with the subassembly 72 and a second edge 122 in contact with the mandrel 70. This contrasts with the second shear disc 76 which has a first edge 124 not in contact with either the subassembly 72 or the mandrel 70, the second shear disc 76 is free to move within its respective recesses 104, 114.

Figure 9:
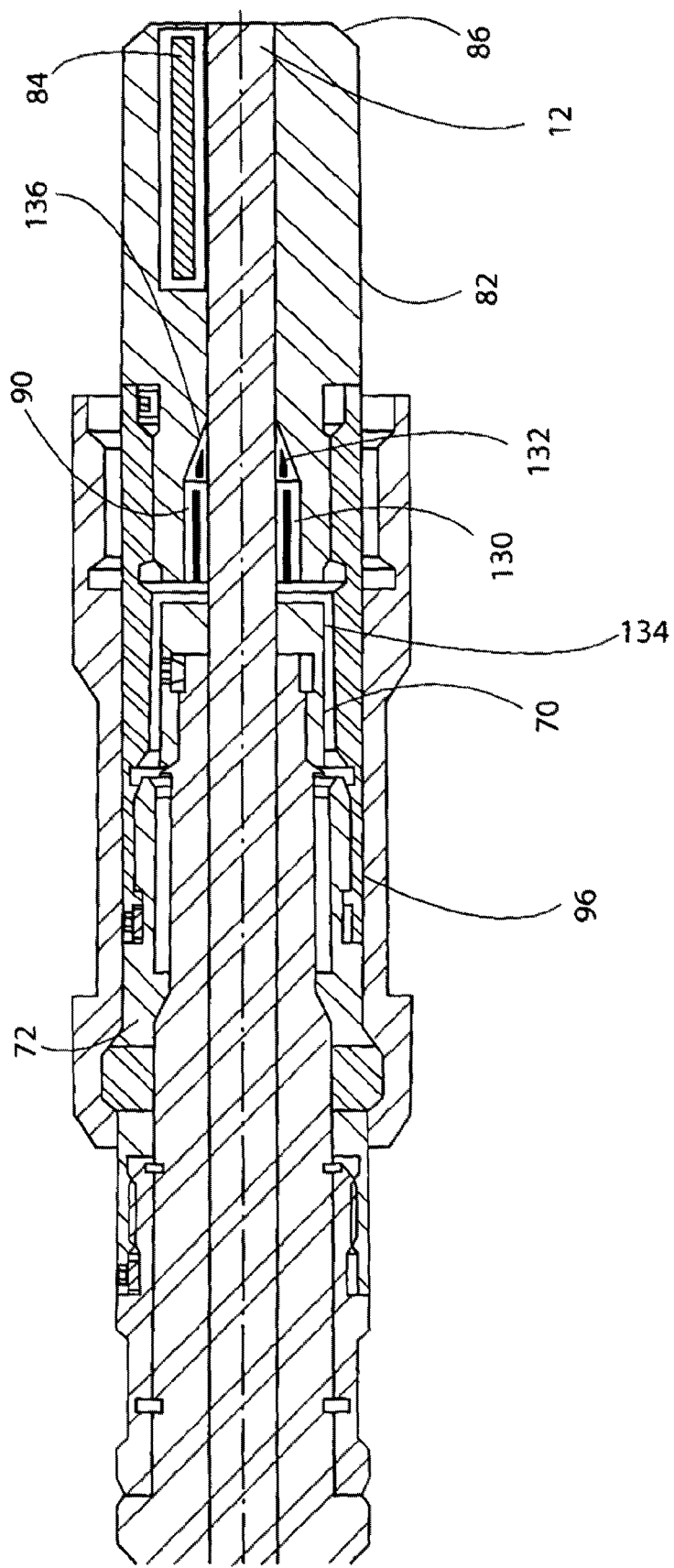
FIG. 9 is an enlarged longitudinal section of a different part of the apparatus of FIG. 8 in the assembled configuration.

FIG. 9 is an enlarged section of the connector 82, the connector sleeve 96, the mandrel 70 and the cable 12. The combination of the elastomeric seal 90 forming a fluid tight engagement with the cable 12 and the connector elastomeric seal 85 forming a seal with the toolstring 14 (not shown in FIG. 9) provides a fluid tight seal either side of the transfer device 84 and ensures a fluid tight environment for the transfer device 84 to operate in.

Figure 10:
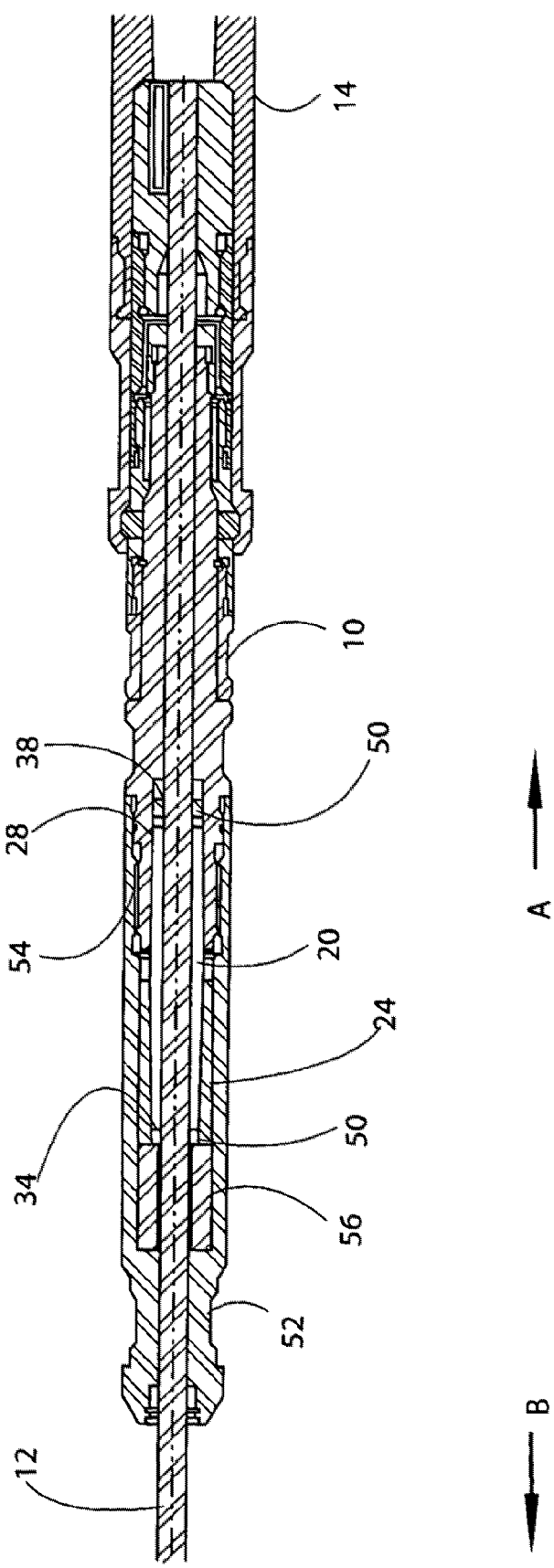
FIG. 10 is a longitudinal section of the apparatus of FIG. 1 in the operational configuration (the same as FIG. 1)

Referring to FIG. 10, with the connector 60 and the toolstring 14 in place, the upper housing 52 is then screwed onto the second apparatus member 28 by means of the threaded connection 54. As the upper housing 52 comes into engagement with the spring 56, the spring 56 presses against the first apparatus member 24. This initial engagement will cause the first apparatus member 24 and the clamp 20 to move in the direction of arrow A towards the second apparatus member 28. The interaction between the second apparatus member 28 and the clamp 20 will cause the clamp second end fingers 50a-d to deflect into engagement with the cable 12. Once the clamp 20 is fully engaged with the cable 12 at the clamp second end 38, the clamp 20 will cease movement in the direction of arrow A. Continued movement of the upper housing 52 along the threaded connection 54 will be translated by the spring 56 into movement of the first apparatus member 24 along the clamp first surface portion 26. This movement of the first apparatus member 24 along the clamp 20 will cause the clamp first end fingers 50e-h to deflect into engagement with the cable 12. Once the clamp first end 34 is fully engaged with the cable 12 continued movement of the upper housing 52 to the extent of its travel along the threaded connection 54 will be taken up by the spring ensuring the clamp 20 cannot be over tightened onto the cable 12.

In the position shown in FIG. 10 the apparatus 10 is fully connected to the toolstring 14 and is ready for operation. A pull on the cable 12 from surface which results in a movement of the cable 12 in the direction of arrow B will bring the fingers 50e-h at the first end 34 of the clamp 20 into tighter engagement with the cable 12, and similarly any movement in the direction of arrow A of the cable 12 will bring the fingers 50a-d at the second end 38 of the clamp 20 into tighter engagement with the cable 12. The cablehead 10 is therefore adapted to provide improved performance by securing the cable 12 when a load is applied in either axial directions.

There may be a circumstance that the toolstring 14 comes stuck downhole. In this circumstance the cablehead 10 is adapted to release from the collar 60 and the toolstring 14. Referring firstly to FIG. 11, assuming the toolstring 14 is stuck downhole and a pull of sufficient magnitude is applied in the direction of arrow B to the cable 12 (not shown), the first shear disc 74 will shear and the weight of the pull is transferred onto the second shear disc 76 which is then compressed in the recesses 104, 124. Once sufficient load has been applied to the second shear disc 76 to cause it to shear, the position shown in FIG. 12 is realised in which the keys 78 can drop away from the collar 60 into the recesses 100 defined by the mandrel 70. The radially inward movement of the key 78 releases the collar 60 and the toolstring 14 from the rest of the cablehead 10 allowing the rest of the cable head 10 to be recovered to surface.

It will be noted the upper housing 52 defines a profile 150. This profile 150 is shaped to be engaged by a tool catcher at surface. This permits the cablehead 10 to be recovered to surface in an emergency such as a blow-out. The engagement of the cablehead 10 with the tool catcher (not shown) indicates to the operator that the cablehead 10 is clear of the well and the well invokeable barriers can be set thereby securing the well.

Figure 13:
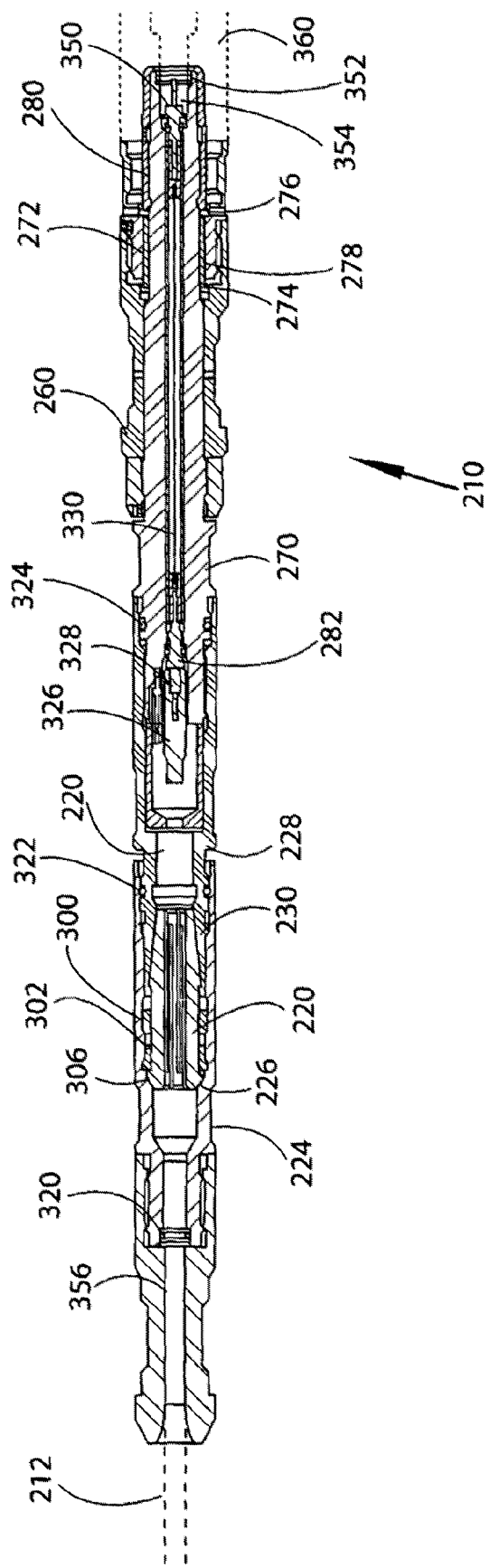
FIG. 13 is a longitudinal section of an apparatus for gripping a support member with the support member shown in broken line outline according to a second embodiment of the present invention.

Referring now to FIG. 13, a longitudinal section of an apparatus 210 for gripping a support member (shown in broken outline) 212 in the form of a cable 212, according to a second embodiment of the present invention.

The apparatus 210 is largely the same in operation as the apparatus 10 of FIG. 1. However there are a number of differences. For example, the first external clamp portion surface 226 defines a taper having a much steeper angle to the longitudinal axis of the apparatus 210 than the second external clamp portion surface 230. The reason for the steeper surface 226 is to assist in the disengagement of the clamp 220 from the cable 212. The disengagement becomes predictable. This has a further effect that the apparatus 210 does not require both a first apparatus member 24 and an upper housing 52 as is the case in the first embodiment. In this embodiment the first apparatus member and the upper housing are combined into the first apparatus member 224 which is connected to the second apparatus member 228 by the threaded connection 254. As first apparatus member 224 is unscrewed from the second apparatus member 228, the clamp 220, and particularly the first external clamp portion surface 226, will disengage from first apparatus member 224 because of the higher friction that exists between the second external clamp portion surface 230 and the second apparatus member 228. This higher friction is due to the larger normal force which exists between the clamp 220 and the second apparatus member 228 due to the longer shallower taper.

Figure 14:
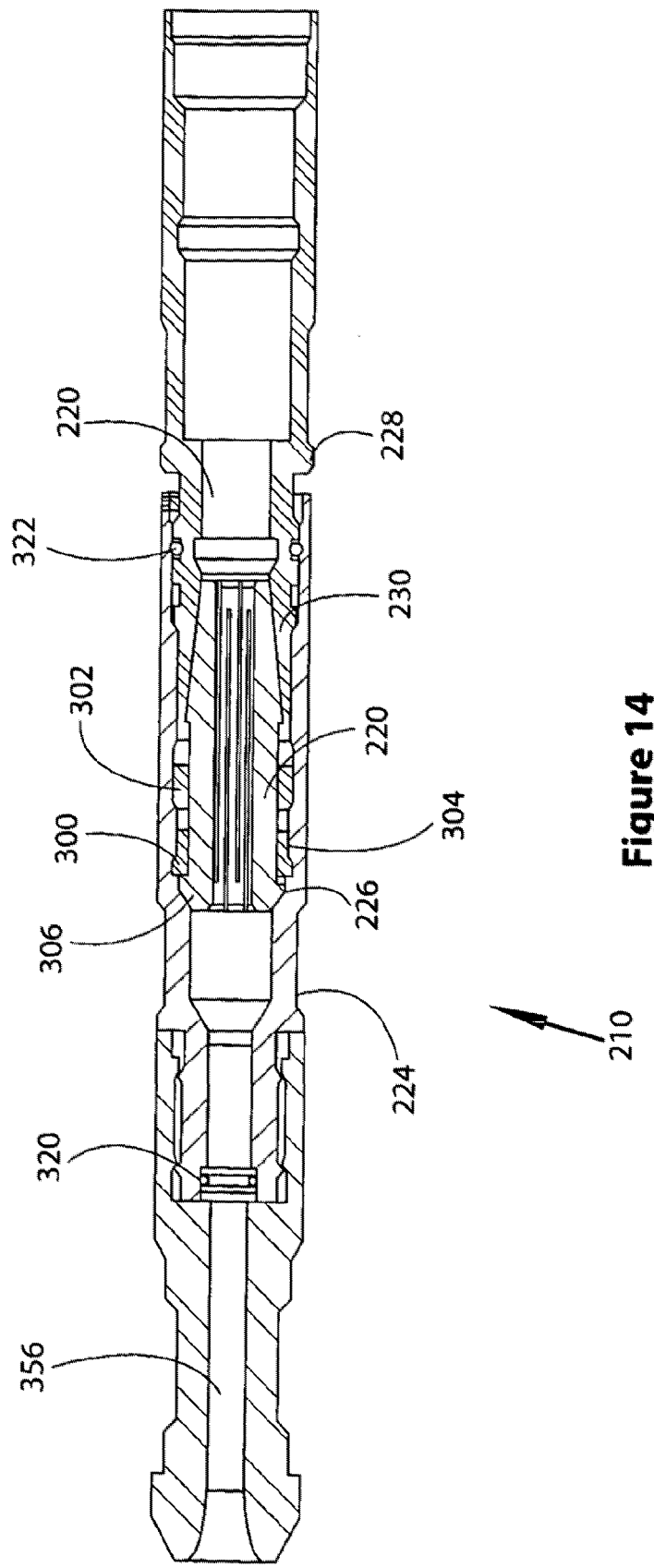
FIG. 14 is a close-up of part of a longitudinal section of the apparatus of FIG. 13.
Figure 15:
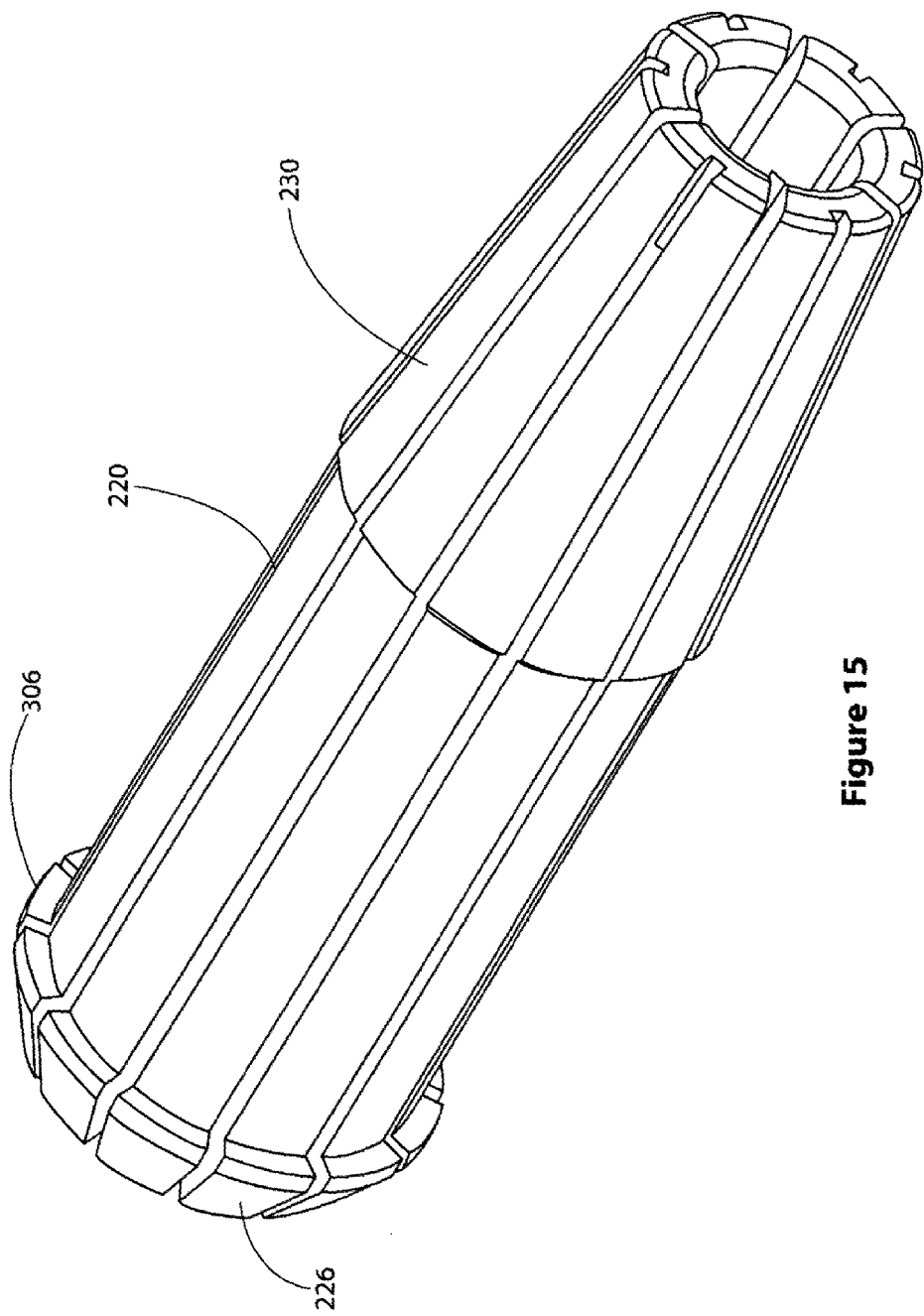
FIG. 15 is a perspective view of the clamping member of the apparatus of figure FIG. 13.

As first apparatus member 224 moves, the clamp 220 stays fixed relative to the second apparatus 228. However first apparatus member 224 is provided with an abutment device 300 in the form of the externally threaded castellated nut 302 which is attached to a thread 304 defined by an internal surface of first apparatus member 224. This is best seen in FIG. 14 a close-up longitudinal section of part of the apparatus of FIG. 13. As first apparatus member 224 moves with respect to the clamp 220 and the second apparatus 228, the externally threaded nut 302 moves towards, and comes into engagement with, a clamp shoulder 306, fixing the clamp 220 with respect to first apparatus member 224 in the direction of travel of first apparatus member 224. Continued movement of first apparatus member 224 breaks the frictional engagement between the second external clamp portion surface 230 and the second apparatus 228. The clamp 220 is now disengaged from the forces which were compressing it on the cable 212, allowing the cable 212 to be removed. A perspective view of the clamp 220 is shown in FIG. 15.

The apparatus 210 also includes a different structure for the electrical connector 282 and a different sealing arrangement to protect the electrical connector 282 (best seen in FIG. 13). In this embodiment, the electrical connector 282 is housed within the mandrel 270. The electrical connector 282 is protected by a first O-ring seal 320, a second O-ring seal 322 and a third O-ring seal 324. These O-ring seals 320, 322, 324 are provided to prevent water ingress and gas migration through the joints within the apparatus 210 into the apparatus throughbore 220 and potentially interfering with connection between the cable 212 and the electrical connector 282. A further, secondary barrier is provided in the form of a rubber sleeve or rubber boot 326 which fits over the interface 328 between the cable 212 and the electrical conduit 330.

Figure 16:
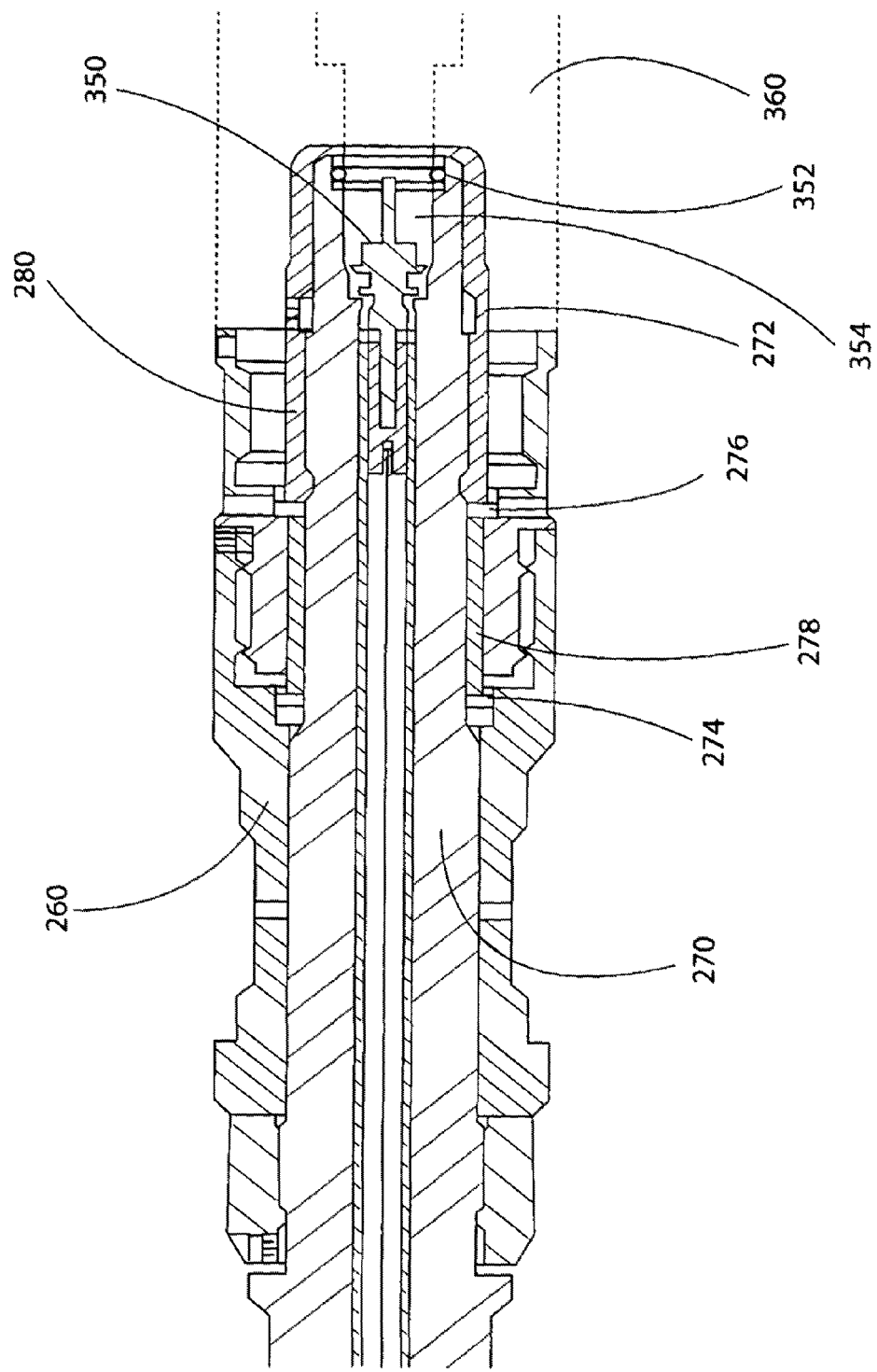
FIG. 16 is a close-up of part of a longitudinal section of the apparatus of FIG. 13.

Referring to FIG. 16, a close-up longitudinal section of part of the apparatus 210 of FIG. 13, it will be noted that the interface 350 between the electrical connector and a downhole tool (shown in broken outline) 360 is provided with a further O-ring seal 352. This O-ring seal 352 seals a chamber 354 into which part of the tool 360 is inserted. This seal 352 has an internal diameter which is the same as the first O-ring seal 320 which seals against the cable 212. As the internal diameters of the seals 352, 320 are the same, the apparatus 210 is not exposed to any unnecessary pressure differential.

Continuing to refer to FIG. 16, a further difference between the first embodiment 10 and the second embodiment 210 will be described. The difference is the connection between the mandrel 270 and the tool string attachment collar 260. In this embodiment, the cablehead subassembly 272 comprises first and second shear rings 274, 276 separated by a first subassembly sleeve 278 and an end sleeve 280. This arrangement facilitates assembly of the apparatus 210.

Figure 17:
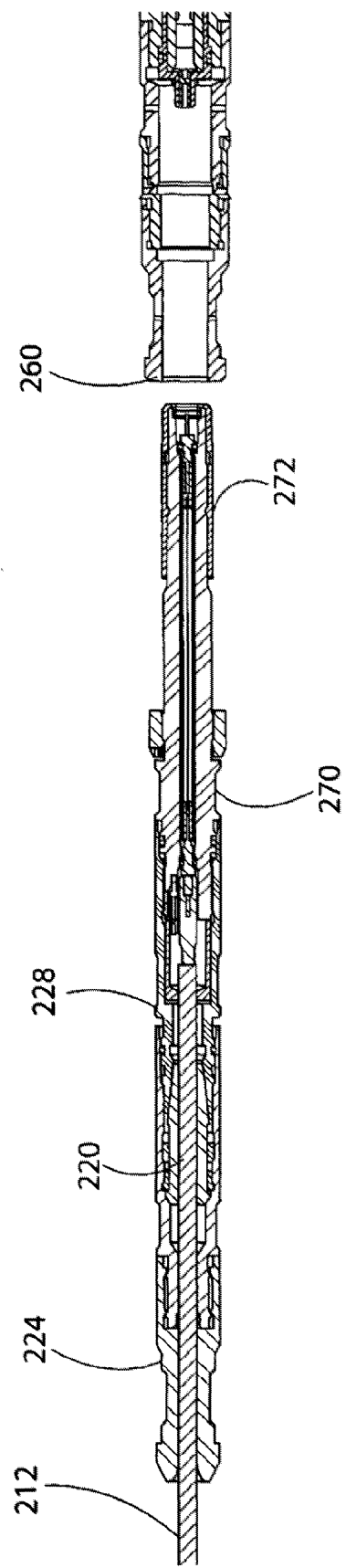
FIG. 17 is a longitudinal section of the apparatus of FIG. 13 showing the tool string attachment collar disengaged from the main body of the apparatus.

To assemble this part of the apparatus 210, the tool string attachment collar 260 is slid over the mandrel 270. The first shear ring 274, the first subassembly sleeve 278, the second shear ring 276 and the end sleeve 280 are moved, in that order on to the mandrel 270 into the position shown in FIG. 16, the end sleeve 280 forming a threaded connection with the external surface of the mandrel 270, thereby locking the first shear ring 274, the first subassembly sleeve 278, and the second shear ring 276 in place. As the shear rings 274, 276 are slid over the external surface of the mandrel 270 they do not need to be split like the shear rings 106 of the first embodiment shown in FIG. 7, they can be solid rings; the shear rings 274, 276 secure the toot string; attachment collar 260 and the tool 360 to the mandrel 270. As in the earlier embodiment, should the tool 360 get stuck in a downhole location, an over-pull on the apparatus 210 will release the tool string attachment collar 260 and the tool 360 from the rest of the apparatus 210, as shown in FIG. 17. In this embodiment, as there is a length of electrical conduit 330 between the cable and the tool 360, the connection between the cable 212 and the electrical conduit 330 is maintained throughout this process, permitting the main body of the cablehead to be reused without requiring the electrical and mechanical interfaces to be remade.

Various modifications and improvements may be made to the above described embodiments without departing from the scope of the invention. For example although the embodiment described has two shear discs 74, 76, shear pins or a single shear disc could be utilised to achieve a similar result.

The invention claimed is:

1. A downhole apparatus for gripping a support member, the apparatus comprising:
   a tubular clamp, the tubular clamp defining a throughbore adapted to receive a support member therethrough;
   a first apparatus member adapted to engage a first portion of an external surface of the tubular clamp, wherein the first apparatus member is adapted to slide over the first portion of the clamp external surface;
   a second apparatus member adapted to engage a second portion of the external surface of the tubular clamp, wherein the second apparatus member is adapted to slide over the second portion of the clamp external surface; and
   a resilient element wherein the resilient element is adapted to apply a force to the first apparatus member to move the first apparatus member with respect to the tubular clamp,
   wherein the tubular clamp comprises a first support member engaging surface adjacent a first end of the tubular clamp and a second support member engaging surface adjacent a second end of the tubular clamp, the first support member engaging surface comprising first end fingers and the second support member engaging surface comprising second end fingers, and
   wherein the apparatus is adapted to increase the grip on the support member if a pull is applied to the support member from either direction.

2. The apparatus of claim 1, wherein the first apparatus member defines an internal surface adapted to engage first portion of the clamp external surface.

3. The apparatus of claim 1, wherein the first second apparatus member defines an internal surface adapted to engage the second portion of the clamp external surface.

4. The apparatus of claim 1, wherein the first and second apparatus members are adapted to slide in a direction parallel to the tubular clamp throughbore or are adapted to slide towards each other.

5. The apparatus of claim 1, wherein the clamp external surface second portion defines a taper and wherein the first portion taper angle to the clamp longitudinal axis is different than the angle of the second portion taper to the clamp longitudinal axis.

6. The apparatus of claim 5, wherein the first portion taper angle is steeper than the second portion taper angle.

7. The apparatus of claim 5, wherein the first apparatus member defines an internal surface with a taper which is complementary to the first portion taper.

8. The apparatus of claim 5, wherein the second apparatus member defines an internal surface with a taper which is complementary TO the second portion taper.

9. The apparatus of claim 1, wherein the clamp defines the first support member engaging surface adjacent the clamp first end.

10. The apparatus of claim 9, wherein the first support member engaging surface is defined, by the first end fingers and the second support member engaging surface is defined by the second end fingers.

11. The apparatus of claim 1, wherein the first support member engaging surface defines a profile.

12. The apparatus of claim 11, wherein the profile is a threaded profile.

13. The apparatus of claim 11, wherein the first support member engaging surface is smooth.

14. The apparatus of claim 13, wherein the second support member engaging surface defines a profile.

15. The apparatus of claim 14, wherein the second support member engaging surface is smooth or threaded.

16. The apparatus of claim 1, wherein the clamp defines the second support member engaging surface adjacent the clamp second end.

17. The apparatus of claim 16, wherein the second support member engaging surface is defined by the second end fingers.

18. The apparatus of claim 1, wherein the entire clamp internal surface defines a profile, the profile is a threaded profile or any suitable friction increasing arrangement.

19. The apparatus of claim 1, wherein the first apparatus member is adapted to releasably engage the second apparatus member.

20. The apparatus of claim 1, wherein the apparatus further comprises an upper housing.

21. The apparatus of claim 20, wherein the upper housing is adapted to releasably engage the second apparatus member.

22. The apparatus of claim 21, wherein the upper housing releasably engages the second apparatus member by means of a threaded connection.

23. The apparatus of claim 22, wherein when the upper housing is releasably engaged with the second apparatus member, the first apparatus member is wholly contained within an upper housing throughbore.

24. The apparatus of claim 22, wherein when the upper housing is releasably engaged with the second apparatus member, the first apparatus member is relatively movable with respect to the upper housings.

25. The apparatus of claim 20, wherein during releasable engagement of the upper housing to the second apparatus member, the upper housing can move relative to the first apparatus member.

26. The apparatus of claim 25, wherein the first apparatus member remains stationary.

27. The apparatus of claim 25, wherein the upper housing slides over the first apparatus member.

28. The apparatus of claim 1, wherein the resilient element is located within the upper housing throughbore.

29. The apparatus of claim 1, wherein the resilient element moves the first apparatus member axially with respect to the clamp throughbore.

30. The apparatus of claim 29, wherein as the first apparatus member moves with respect to the tubular clamp, the friction between the first apparatus member and the tubular member will increase.

31. The apparatus of claim 1, wherein the apparatus further comprises a mandrel.

32. The apparatus of claim 31, wherein the mandrel is connected to the second apparatus member.

33. The apparatus of claim 32, wherein the mandrel is integral with the second apparatus member.

34. The apparatus of claim 33, wherein the mandrel defines the second apparatus member.

35. The apparatus of claim 31, wherein the apparatus further comprises a collar, the collar being adapted to be releasably attachable to a toolstring and releasably attachable to the mandrel.

36. The apparatus of claim 35, wherein the collar is releasably attachable to the mandrel by a subassembly.

37. The apparatus of claim 36, wherein the subassembly is releasably attachable to the mandrel.

38. The apparatus of claim 37, wherein the subassembly is releasably attachable to the mandrel by means of an at least one shear member.

39. The apparatus of claim 38, wherein the one of said at least one shear members are adapted to shear before another of said at least one shear members.

40. The apparatus of claim 36, wherein the apparatus comprises a connection device.

41. The apparatus of claim 40, wherein the connection device is provided by the subassembly.

42. The apparatus of claim 40, wherein the connection device is adapted to provide a connection between the support member and the toolstring.

43. The apparatus of claim 42, wherein the connection is an electrical connection, a hydraulic connection, a fluid connection, fiber optic connection or any suitable or desired connection.

44. The apparatus of claim 42, wherein the apparatus comprises at least one primary seal and at least one secondary seal.

45. The apparatus of claim 44, wherein the/each primary seal is provided between the support member and the external environment to prevent water ingress or gas migration into the connection.

46. The apparatus of claim 44, wherein the at least one secondary seal is adapted to cover at least part of the connection.

47. The apparatus of claim 46, wherein the at least one secondary seal is a sleeve.

48. The apparatus of claim 36, wherein the subassembly is adapted to form a toolstring seal with the toolstring.

49. The apparatus of claim 48, wherein the toolstring seal is elastomeric.

50. The apparatus of claim 48, wherein the subassembly is adapted to form a support member seal with the support member.

51. The apparatus of claim 50, wherein the support member seal is elastomeric.

52. The apparatus of claim 48, wherein the subassembly toolstring seal is on a first side of the connection and the subassembly support member seal is on a second side of the connection.

53. The apparatus of claim 1, the apparatus comprising:
a housing adapted to the releasably engage the second apparatus member, and
a resilient member located within the housing and adapted, upon engagement of the housing and the second apparatus member, to apply a force to the first apparatus member to move the first apparatus member with respect to the tubular clamp.

54. The apparatus of claim 53, wherein at a predetermined degree of friction between the first apparatus member on the tubular clamp, further movement of the first apparatus member by the resilient member is prevented.

55. The apparatus of claim 1;
wherein the tubular clamp external surface defines a decreasing circumferential taper,
the first and second portions surfaces being tapered, each taper decreasing towards the end of the tubular clamp to which it is closest.

56. A method of gripping a support member downhole, the method comprising the steps of:
providing a support member;

providing an apparatus for gripping the support member, the apparatus comprising;
a tubular clamp, the tubular clamp defining a throughbore;
a first apparatus member adapted to engage a first portion of an external surface of the tubular clamp; and
a second apparatus member adapted to engage a second portion of the external surface of the tubular clamp, the method further comprising the steps of;
gripping a support member with a downhole apparatus, the apparatus comprising:
a tubular clamp, the tubular clamp defining a throughbore adapted to receive a support member therethrough;
a first apparatus member adapted to engage a first portion of an external surface of the tubular clamp, wherein the first apparatus member is adapted to slide over the first portion of the clamp external surface;
a second apparatus member adapted to engage a second portion of the external surface of the tubular clamp, wherein the second apparatus member is adapted to slide over the second portion of the clamp external surface; and
a resilient element, wherein the resilient element is adapted to apply force to the first apparatus member to move the first apparatus member with respect to the tubular clamp,
wherein the tubular clamp comprises a first support member engaging surface adjacent a first end of the tubular clamp and a second support member engaging surface adjacent a second end of the tubular clamp, the first support member engaging surface comprising by first end fingers and the second support member engaging surface comprising second end fingers, and
wherein further the apparatus is adapted to increase the on the support member if a pull is applied to the support member from either direction,
feeding the support member through the tubular clamp throughbore;
engaging the first apparatus, member with a first portion of an external surface of the tubular clamp;
engaging the second apparatus member with a second portion of external surface of the tubular clamp;
applying the pull to the support member from either direction such that the apparatus is adapted to increase grip on the support member.

57. A combination of a support member and an apparatus for gripping the support member, the apparatus for gripping a support member comprising:
a support member and a downhole apparatus for gripping the support member, the downhole apparatus comprising;
a tubular clamp, the tubular clamp defining, a throughbore adapted to receive a support member therethrough;
a first apparatus member adapted to engage a first portion of an external surface of the tubular clamp, wherein the first apparatus member is adapted to slide over the first portion of the clamp external surface;
a second apparatus member adapted to engage a second portion of the external surface of the tubular clamp, wherein the second apparatus member is adapted to slide over the second portion of the clamp external surface; and
a resilient element, wherein the resilient element is adapted to apply a force to the first apparatus member to move the first apparatus member with respect to the tubular clamp,
wherein the tubular clamp comprises a first support member engaging surface adjacent a first end of the tubular clamp and a second support member engaging surface adjacent a second end of the tubular clamp, the first support member engaging surface comprising first end fingers and the second support member engaging surface comprising second end fingers, and
wherein the apparatus is adapted to increase the grip on the support member if a pull is applied to the support member from either direction.

58. The combination of a support member and an apparatus for gripping the support member of claim 57, wherein the support member is selected from one of; a cable, wireline, slickline, a composite cable, a tubular, a steel tubular, a composite tubular, a rod, and a composite rod.

* * * * *